(12) United States Patent
Carroll

(10) Patent No.: US 7,350,797 B2
(45) Date of Patent: Apr. 1, 2008

(54) REAR BICYCLE SUSPENSION

(76) Inventor: Ryan Michael Carroll, 7270 Poppy Way, Arvada, CO (US) 80007

( * ) Notice: Subject to any disclaimer, the term of this patent is extended or adjusted under 35 U.S.C. 154(b) by 538 days.

(21) Appl. No.: 11/081,440

(22) Filed: Mar. 16, 2005

(65) Prior Publication Data

US 2005/0156402 A1   Jul. 21, 2005

Related U.S. Application Data

(63) Continuation-in-part of application No. 10/278,576, filed on Oct. 23, 2002, now Pat. No. 6,886,846.

(60) Provisional application No. 60/408,712, filed on Sep. 6, 2002.

(51) Int. Cl.
*B62K 25/26* (2006.01)

(52) U.S. Cl. ........................................ 280/284; 280/283

(58) Field of Classification Search ................ 280/284, 280/283, 285, 275
See application file for complete search history.

(56) References Cited

U.S. PATENT DOCUMENTS

| | | | | |
|---|---|---|---|---|
| 4,360,214 A | * | 11/1982 | Isono | 280/284 |
| 4,489,803 A | * | 12/1984 | Fukuchi | 180/227 |
| 4,505,492 A | * | 3/1985 | Tsunoda | 280/284 |
| 4,574,909 A | * | 3/1986 | Ribi | 180/227 |
| 4,673,053 A | * | 6/1987 | Tanaka et al. | 180/227 |
| 6,164,676 A | * | 12/2000 | Wilcox | 280/284 |
| 6,581,711 B1 | * | 6/2003 | Tuluie | 180/227 |
| 6,598,893 B2 | * | 7/2003 | Parigian | 280/284 |
| 6,886,846 B2 | * | 5/2005 | Carroll | 280/284 |

* cited by examiner

*Primary Examiner*—Anne Marie Boehler
(74) *Attorney, Agent, or Firm*—Scott L. Terrell, P.C.; Scott L. Terrell

(57) ABSTRACT

A rear bicycle suspension has a main frame including a seat riser tube, a down tube, head tube, and a bottom bracket housing having left and right sides, a guide arm and a shock mount attached to the main frame, a pair of swing arm assemblies each one in pivotal attachment on either side of the main frame at a first pivot point and to a bell crank at a second pivot point, the swing arms in rearward extension form the first and second pivot points to at least one rear swing arm attachment point, and further including a lever arm connected between the first and the second pivot points, a guide arm having first and second ends wherein the first end in pivotal attachment to the guide arm bracket at a fifth pivot point and the second end extends upward and rearward from the fifth pivot point, wherein the bell crank is pivotally connected between the lever arms at the second pivot point and to the guide arm at a third pivot point, a shock absorbing member in pivotal attachment at one end to the shock mount and at another end at a fourth pivot point to the bell crank.

8 Claims, 5 Drawing Sheets

US 7,350,797 B2

REAR BICYCLE SUSPENSION

CROSS REFERENCE TO RELATED APPLICATIONS

This Continuation-in-part Application claims the benefit of U.S. application Ser. No. 10/278,576, filed Oct. 23, 2002 now U.S. Pat. No. 6,886,846, which claims the benefit of the 35 U.S.C. § 111(b) Provisional Application Ser. No. 60/408,712, filed Sep. 6, 2002.

BACKGROUND OF THE INVENTION

1. Field of the Invention

This invention relates to rear bicycle suspensions. More particularly, it relates to rear shock absorbing suspensions.

2. Description of the Related Art

Rear shock absorbing suspensions for bicycles, such as a mountain bike, are well known in the art. Most of the prior art designs are configured with a goal of optimizing pedal force neutralization or providing great suspension movement. However, to provide a good all-around freerider bike, a more sturdy and durable the bike is needed. A problem exists in that a great suspension movement usually gives way to poor pedaling performance and vice versa.

To provide a durable suspension it is also desirable to maximize the service life of the shock absorbing member. Most of the prior art designs disclose a shock absorbing member mounted to a lever arm or crank in such a way that the angle between the axis of the shock absorbing member and the axis drawn through the shock absorbing member and the pivotal attachment point of the lever arm is in a range of 50 to 70 degrees, depending on the desired rear axle travel. The effectiveness of this relative mounting angle, in the uncompressed state of the shock absorbing member, is that upon activation of the rear suspension system the lever arm pivots about its pivotal attachment point and compresses the shock absorbing member. Upon full compression of the shock absorbing member the mounting angle approaches or equals 90 degrees.

This produces a wheel rate that can be progressive, linear or a falling rate. In prior art, this change in angle ranges from 20 to 40 degrees. The lever arm then loads the shock absorbing member with a force vector that is tangent to the radius that is defined by the length from the lever arm attachment point and the shock pivotal attachment point, and tangential force vector is perpendicular to the axis drawn between the attachment points. This vector force then has vertical and horizontal forces with respect to the shock absorbing axis. The change in mounting angle produces this side loading of the shock absorbing member with the horizontal force, causing undue friction along the seals, guide bushings and control shaft. The added friction resists allowing the swing arm to rotate upwardly and reduces the smoothness and control of the rear wheel in response to an irregularity in the roadway. The side loading of the shaft also allows for unequal sealing around the shaft allowing dirt and other contaminates inside the shock body. All of these factors contribute to decrease service of life of the shock-absorbing member.

Thus, it is desirable to provide a durable suspension bike that pedals like a hardtail, but soaks up the bumps efficiently. It is also desirable to provide a suspension system which minimizes side loading of the shock absorbing member and can be used in a variety of frame designs leaving designers a wide selection of placement points. It is also desirable to provide a suspension system that is useful with either a four bar linkage or in a single pivot configuration. It is also desirable to provide a rear suspension system that facilitates a rear wheel path which moves up and slightly back during compression to absorb the direction of the forces from the terrain while also maintaining the chain parallel to the suspension path. The present invention satisfies these needs.

Accordingly, it is an object of the present invention to provide a shock absorbing rear suspension system which minimizes side loading of the shock absorbing member and is useful with a variety of frame designs.

It is another object of the present invention to provide a shock absorbing rear suspension which causes the bike to pedal more like a hardtail, but which easily soaks up the bumps.

It is another object of the present invention to provide a shock absorbing rear suspension system that is useful in conjunction with either a 4 bar linkage or in a single pivot configuration.

It is another object of the present invention to provide a main four bar linkage system for optimal cycling performance through control of wheel path and neutralization of pedal forces.

It is another object of the present invention to provide a progressive link mechanism for variable travel independent tuning of spring rate.

It is yet another object of the present invention to provide a rear suspension system that facilitates a rear wheel path which moves up and slightly back during compression to absorb the direction of the forces from the terrain, but which also keeps the chain parallel to the suspension path.

SUMMARY

Unless specifically defined otherwise, all technical or scientific terms used herein have the same meaning as commonly understood by one of ordinary skill in the art to which this invention belongs. As used herein wheel rate is defined as the force per unit of length of actual displacement (by example, Newton per meter) measured at the rear axle from external inputs to the rear wheel and could be either progressive, linear, or falling. Leverage ratio is a force ratio (unitless) obtained by dividing force at the rear axle by the force measured to the shock-absorbing member. Load angle is the angle between the shock absorbing member's axis when in the uncompressed state and the shock absorber member's axis when full compressed state. Although any methods and materials similar or equivalent to those described herein can be used in the practice or testing of the present invention, the preferred methods and materials are now described.

The present invention provides a rear bicycle suspension having a main frame including a seat riser tube, a down tube, head tube, and a bottom bracket housing having left and right sides, a guide arm bracket and a shock mount attached to the main frame, a pair of swing arm assemblies each one in pivotal attachment on either side of the main frame at a first pivot point and to a bell crank at a second pivot point, the swing arms in rearward extension from the first and second pivot points to at least one rear swing arm attachment point, and further including a lever arm connected between the first and the second pivot points, a guide arm having first and second ends wherein the first end is in pivotal attachment to the guide arm bracket at a fifth pivot point and the second end extends upward and rearward from the fifth pivot point, wherein the bell crank is pivotally connected between the lever arms at the second pivot point and to the guide arm at a third pivot point, a shock absorbing member is in pivotal attachment at one end to the shock mount and at another end at a fourth pivot point to the bell crank, the first pivot point is positioned substantially above and forward the bottom bracket, the second pivot point is positioned substantially rearward the first pivot point, the third pivot point is positioned substantially below the second pivot point, the fourth pivot point is positioned substantially forward a vector passing through the first and second pivot points and may, but need not, be positioned below the second pivot point, and the fifth pivot point is positioned above and rearward the first pivot point.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

DESCRIPTION OF THE PREFERRED EMBODIMENTS

Figure 1:
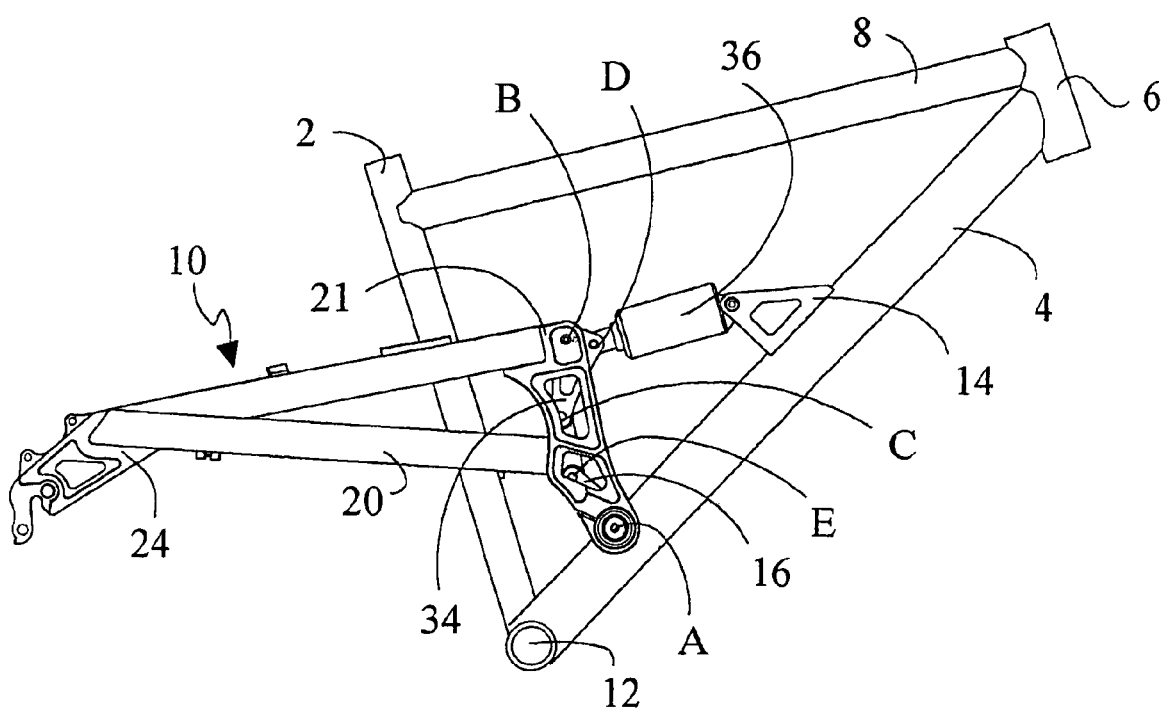
FIG. 1 is an elevation view of my suspension system in a single pivot suspension.
Figure 2:
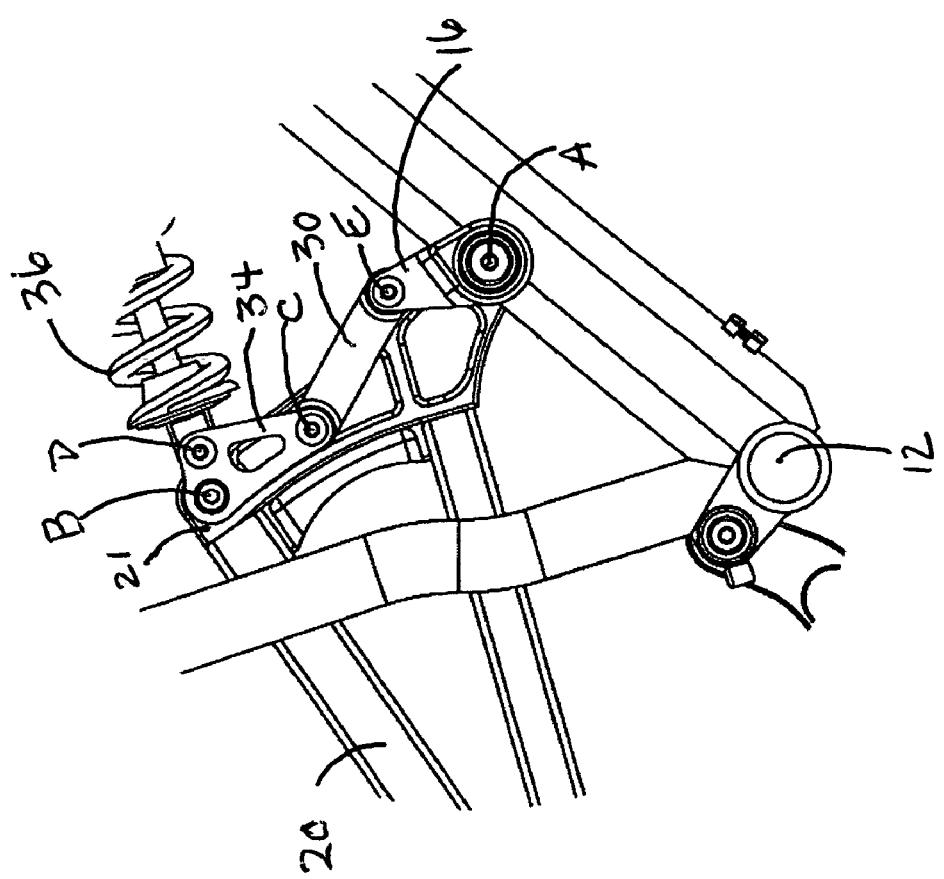
FIG. 2 is a perspective view of my suspension system in the single pivot suspension shown in FIG. 1.

Referring now to the drawing figures wherein like numerals represent like features there is shown in FIGS. 1 and 2 an embodiment of my suspension system when used in conjunction with a single pivot system. This system utilizes an optimized single pivot suspension location that works with my progressive link assembly, described below, to optimize the rear shock spring tuning. The single pivot system works because the travel is limited to four inches and the swing arms only follow a rear arching path. If the travel were more than this an arching forward problem encountered with many prior art suspensions would arise.

In FIGS. 1 and 2, a bicycle frame is shown which incorporates the rear suspension 10, according to the present invention, in the single pivot configuration. The rear suspension 10 of the present invention can also be used on other types of bicycles, as well as motorcycles, but the preferred embodiment is described herein as used on a mountain bike. The mountain bike includes a frame which rotatably supports a steering assembly. The bicycle frame is of a conventional type which also includes a seat tube 2 for adjustably supporting a seat and a down tube 4 extending from the head tube 6 to the bottom of the seat tube 2. A top tube 8 extends from the head tube 6 to the bottom of the seat tube 2. A bottom bracket 12 is attached to the frame at the intersection of the seat tube 2 and the down tube 4. The frame also includes a shock mount 14 and a guide arm bracket 16 connected to the down tube 4.

The suspension system includes a pair of swing arm assemblies 20 each one in pivotal attachment on either side of the main frame at a first pivot point A and to a bell crank 34 at a second pivot point B. The swing arms 20 extend in a rearward direction from the first A and the second B pivot points to at least one rear swing arm attachment point 24. In this single pivot embodiment, the rear attachment point 24 is a point for receiving the rear axles of a bicycle wheel, in any conventional manner. The swing arms 20 further include a lever arm 21 which is connected between the first A and the second pivot points B.

The progressive link system works in conjunction with the swing arms 20 for the manipulation or tuning of the shock absorbing rate for optimal performance. It includes a guide arm 30 with first and second ends. The first end is in pivotal attachment to the guide arm bracket 16 at a fifth pivot point E, and the second end extends upward and rearward from the fifth pivot point E. The bell crank 34 is pivotally connected between the lever arms 21 at a second pivot point B and to the guide arm 30 at a third pivot point C. A conventional shock absorbing member 36 is in pivotal attachment at one end to the shock mount 14 and at another end, at a fourth pivot point D, to the bell crank 34. As illustrated, the first pivot point A is positioned above and forward the bottom bracket 12. The second pivot point B is positioned substantially rearward the first pivot point A. The third pivot point C is positioned substantially below the second pivot point B. The fourth pivot point D is positioned forward a vector (V in FIG. 7) passing through the first A and second B pivot points and may, but need not, be positioned below the second pivot B. Finally, the fifth pivot point E is positioned above and rearward the first pivot point A.

Figure 3:
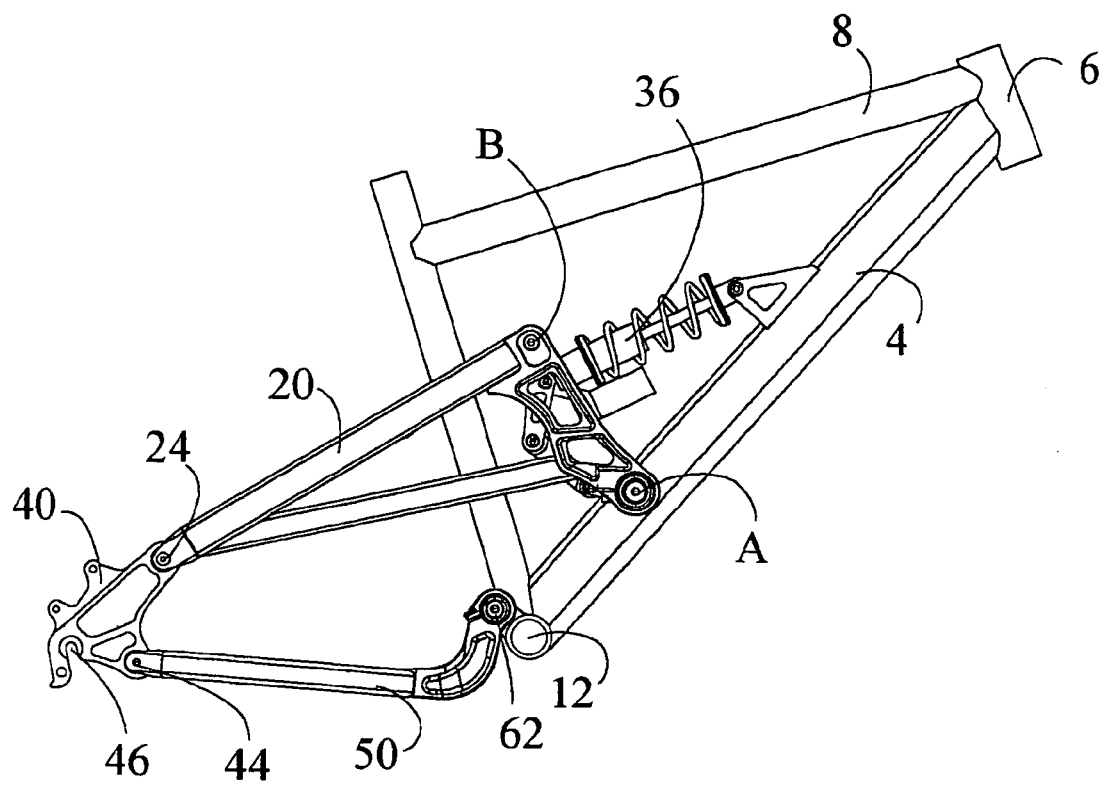
FIG. 3 is an elevation view of an embodiment of my suspension system with a four bar linkage rear suspension.
Figure 4:
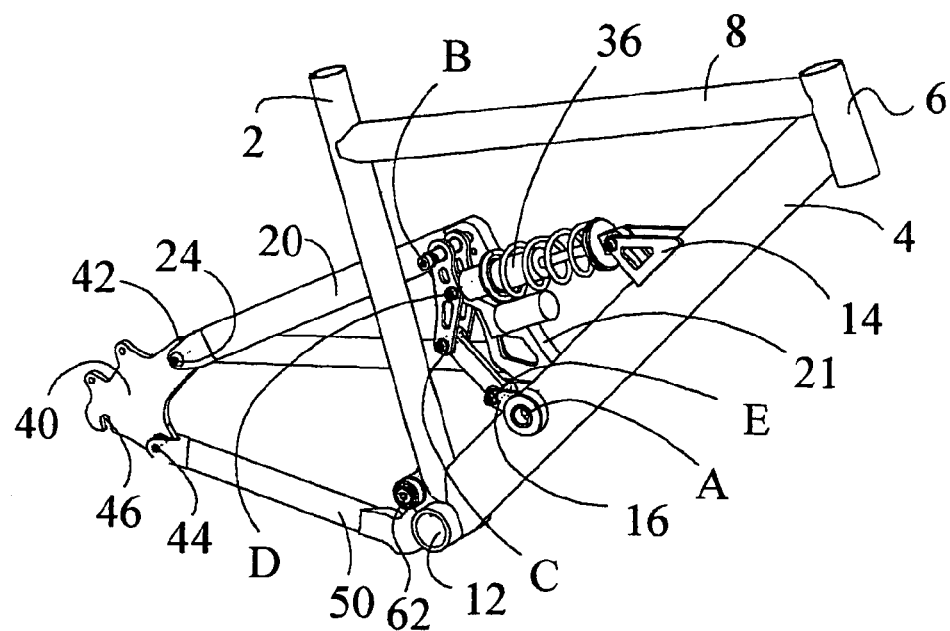
FIG. 4 is a partial perspective view of the embodiment shown in FIG. 3.

FIGS. 3 and 4 illustrate the rear suspension system 10 according to the present invention when used in conjunction with a parallelogram four bar linkage. Here, with the four bar linkage, the swing arm rear attachment point 24 is for receiving a wheel hub link member 40. The rear bicycle suspension includes a pair of the hub link members 40 one for either side of a rear wheel (not shown) each having upper 42 and lower 44 attachment points and a rear 46 attachment point for receiving the axle of a wheel hub (not shown). The swing arm rear attachment point 24 is pivotally attached to the upper attachment point 42 on the wheel hub link 40. The four bar linkage further includes a pair of control arms 50 pivotally attached to the wheel hub link 40 lower attachment point 44 and the frame 62.

The third pivot point C for attachment of the guide arm 44 to the bell crank 34 may be adjustable, such as, by drilling a second set of holes in the bell crank 34, for adjustment of the overall travel. For example, when using the four bar linkage the bicycle is easily designed with 15.2 to 22.8 centimeters of travel. With a 15.2 centimeters of travel design, travel can be adjusted between 12.7 and 15.2 centimeters simply by moving the third pivot point C slightly upward in the bell crank 34. This can be accomplished with a second set of holes drilled in the bell crank for securing the third pivot point C upward with a pin or bolt (not shown).

As described in more detail, the swing arm 20 includes a pair of lever arms 21 which include the second pivot point B located rearward the first pivot point A. Preferably, the second pivot point B is located 17.3 centimeters radial from the first pivot point A. The second pivot point B on the lever arm 21 pivotally connects the bell crank 34 between them. The swing arm 20 preferably includes a pair of support tubes attached to each other at their rearward ends as parts of the rear swing arm attachment point 24. The rear swing arm attachment point 24 also preferably includes an axle attachment point 46 for receiving rear axles of a bicycle wheel in any conventional manner. Persons of ordinary skill in the art will appreciate that the exact configuration and relationship between the support tubes and attachment point can vary depending on, among other things, the size of bicycle and the range of travel. In addition, the individual tubes and attachment points are preferably welded together at their respective junctions but alternative embodiments can secure these components as a single construction formed from a solid sheet, forged, molded or the like. Each of the support tubes are preferably attached at, or near, their forward end to a lever arm 21. The support tubes are preferably welded or otherwise connected at this abutment to secure them to the lever arm 21.

Figure 5:
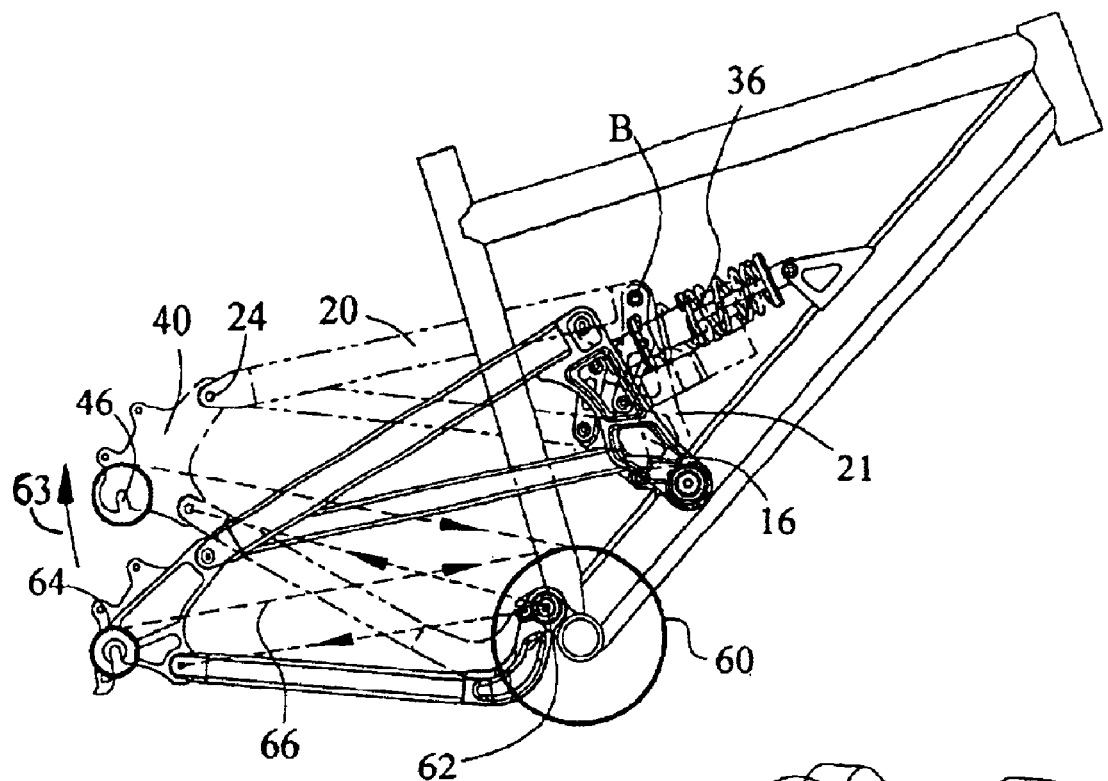
FIG. 5 is an elevation view of my suspension system with a four bar linkage which illustrates an upward and rearward movement of the suspension.

Referring now to FIG. 5, also by incorporating a parallelogram design into the four bar linkage system, the rear wheel path 63 moves up and slightly back during compression to absorb the direction of the forces from the terrain. It also keeps the chain parallel to the suspension path, which helps eliminate increasing or decreasing the chain length and any suspension input from the forces of the drive train.

In FIG. 5, the average chain force torque axis is determined by projecting a straight line 66 tangent to the upper parts of the front 60 and rear drive gears 64. When more than one gear assemblies exists in the front or rear drive gears the average drive gear diameter is determined from averaging the diameters of the largest and smallest gears in the assembly. As a person of ordinary skill in the art will readily appreciate, that by selecting the average size of gearing from the most commonly used gears in the gear ranges, the optimal position for the main pivot 62 can be found and placed on the average chain force torque axis 66. Among other things, this alignment minimizes or at least typically reduces undesirable torque and other interactions between the suspension and the drive chain, thereby improving the translation of the pedaling forces into forward motion of the bicycle.

Figure 6:
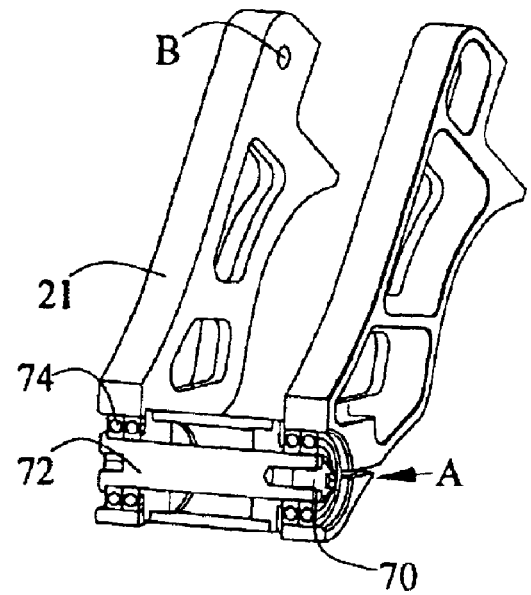
FIG. 6 is a perspective view of the swing arm link members showing detail of the pivot construction.

Referring now to FIG. 6, the lever arms can be of a solid piece of material. Suitable materials used can be forged metals, extruded metals, or carbon fiber composites. The lever arm 21 pivotally attaches on either side of the main frame by any know manner to form the first pivot point A. One such manner is by a screw 70 received in a pin 72, with pin engaging the bearings 74 press fit into the lever arm 21 through the opening of the main pivot, and engaging the bearing on the other side of the main frame. The main pivot is desirable formed of a dead length bushing and the main housing. The dead length bushing supports the side loads of the bearing under tightening of the pin and screw securing system.

The present invention preferably, but need not, includes a pair of bell cranks 34. One of the bell cranks 34 is positioned on either side of the shock absorbing member 36, and they are identical, reducing the number of parts needed for assembly. Each bell crank 34 has three attachment pivot points, with the top pivot point being pivotally connected between the lever arms at the second pivot point B. The third pivot point C is defined as substantially below the second pivot point B. The fourth pivot point D is positioned forward a vector passing through the first A and second B pivot points and may, but need not, be positioned below the second pivot point for connection to a conventional shock absorber 36. The bell crank 34 is desirably constructed of a solid piece of plate material having apertures for weight reduction. Alternate materials of forged or cast parts can also be used for construction of the bell crank in order to create a unified member.

The present invention includes a guide arm 30 with first and second ends. Sealed cartridge bearings are press fit into an opening at the ends of the guide arm 30. The first end of the guide arm 30 is in pivotal attachment, by any conventional manner, to the guide arm bracket 16 at a fifth pivot point E, and the second end extends upward and rearward from the fifth pivot point E for pivotal attachment to the bell crank 34. In the preferred embodiment, the pivotal attachment is accomplished using a screw received in a pin, with pin engaging bearings press fit into both sides of the guide arm ends.

The shock-absorbing member 36 is a component having a first and a second end. The first end is pivotally attached to the shock mount 14 and the second end at the fourth pivot point D, between the bell crank 34. A screw received in a pin with the pin engaging the shock-absorbing member ends is the preferred method of attachment. The shock-absorbing member 36 may consist of any well known fabrication, such as a spring medium like a wire coil, an elastomer, air or any other suitable device or system. The shock-absorbing member 36 may also include a medium for controlling damping of the spring medium such as oil, air or any other conventional medium. The present invention includes a shock mount 14 that is welded to the down tube 4. Alternatively, the attachment point for the shock member 36 to the frame may be formed into the down tube 4. Additionally, an alternate weld location supported between the top tube and down tube may be used for the shock mount 14.

As shown and described herein, the preferred embodiment of the invention operates in the following manner. When the rear wheel of the bicycle collides with an irregularity in the terrain (e.g., a root or rock), the rear axle moves upwardly and rearward to allow the rear wheel to pass over the irregularity and maintain control. To accomplish this, the swing arms 20 rotate about the first pivot point A and move upwardly. In doing so, the second pivot point B rotates pivotal about the first pivot point A, moving forwardly, causing the bell crank 34 to rotate counterclockwise, and while controlled by the guide arm, to rotate forward about the fifth pivot point E. Upon the forward motion of the bell crank 34 toward the frame, the shock-absorbing member 36 is compressed. This combination of upward and rearward movement of the rear axle relative to the frame, allows the rear wheel to pass over the irregularity in the terrain in a smooth and controlled fashion.

For the preferred embodiment, the entire set of pivot locations is a complex relationship that comprises the progressive linkage system. Some important characteristics with respect to the shock absorbing member include, wheel rate, leverage ratio and load angle. Each of the pivots has a different degree to which they affect the performance of these characteristics.

An important advantage provided with the present invention is the interaction of the bell crank 34 and guide arm 16 with the shock absorbing member 36. Returning again to FIG. 5, when the suspensions system is activated by collision, the force applies through the rear swing arm attachment point 24 to the swing arm 20. Generally, the swing arm 20 is moved upwardly 63, which causes the lever arm to rotate clockwise (as shown) about the first pivot point A. The second pivot point B on the lever arm 21 also is rotated in a clockwise direction. Then the bell crank 34 moves forward being controlled by it's attachment to the lever arm 21 and guide arm 16 and rotates in a counterclockwise fashion. The scissors action that the bell crank 34 and guide arm 16 creates compresses the shock absorbing member 36.

Figure 7:
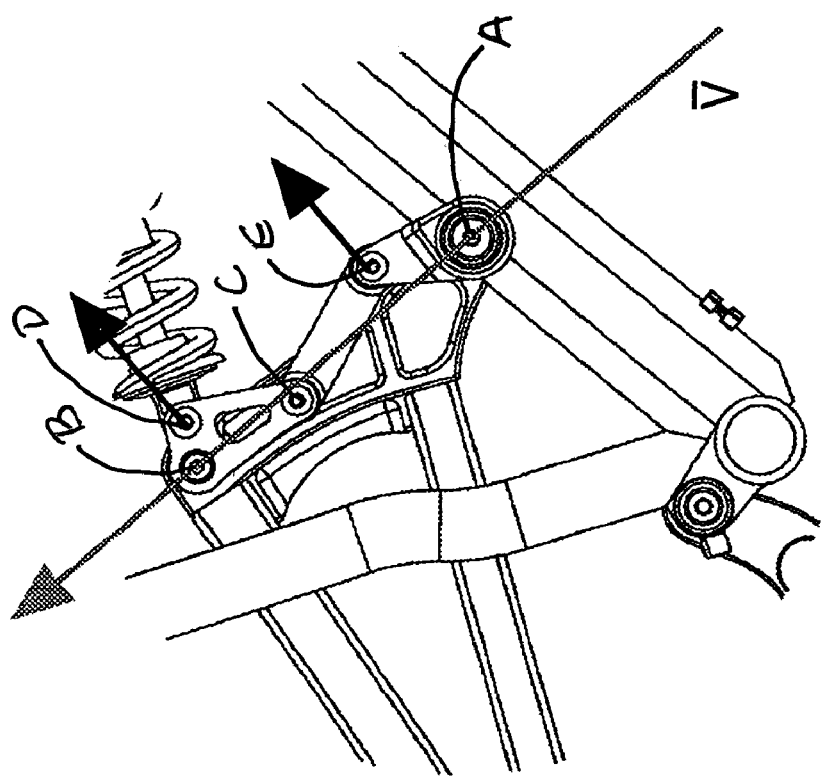
FIG. 7 is an elevation view of the progressive link system showing the fourth pivot point positioned forward a vector passing through the first and second pivot points.

Turning now to FIG. 7, the fourth pivot point D is positioned forward a vector (V in FIG. 7) passing through the first A and second B pivot points and may, but need not, be positioned below the second pivot B. Finally, the fifth pivot point E is positioned above and rearward the first pivot point A.

The entire set of pivots in the linkage system effect the wheel rate and leverage ratio. The distance between the first pivot point A and the second pivot point B have the affect that by increasing the distance between, the wheel rate and the leverage ratio decreases. The distance between the second pivot point B and the third pivot point C have the affect that by increasing the distance between, the leverage ratio increases and the wheel rate has minimal change. The fore/aft placement of the third pivot point C has only a small affect on the wheel rate or leverage ratio. The distance between the second pivot point B and the fourth pivot point D have the affect that by increasing the distance between, the wheel rate and the leverage ratio decreases. As the angle between the axis of the second pivot point B and the third pivot point C to the axis of the second pivot point B and the fourth pivot point D increases, the wheel rate and leverage ratio decrease. The distance between the third pivot point C and the fifth pivot point E have the affect that by increasing the distance between, the wheel rate and the leverage ratio decreases. The aft placement of the fifth pivot point E in relationship to the first pivot point A has the affect that by placement further reward the wheel rate and leverage ratio decrease. The upward placement of the fifth pivot point E in relationship to the first pivot point A has the affect that by placement further reward the wheel rate and leverage ratio increases.

The foregoing description is considered as illustrative only of the principles of the invention. Furthermore, since numerous modifications and changes will readily occur to those skilled in the art, it is not desired to limit the invention to the exact construction as described above. Accordingly, all suitable modifications and equivalents may be resorted to falling within the scope of the invention as defined by the claims which follow.

I claim:

1. A rear bicycle suspension, comprising:
    (a) a main frame including a seat riser tube, a down tube, head tube, and a bottom bracket housing having left and right sides;
    (b) a guide arm bracket and a shock mount attached to the main frame;
    (c) a pair of swing arm assemblies each one in pivotal attachment on either side of the main frame at a first pivot point and to a bell crank at a second pivot point, the swing arm assemblies in rearward extension from the first and second pivot points to at least one rear swing arm attachment point, and further including a lever arm connected between the first and the second pivot points;
    (d) a guide arm having first and second ends wherein the first end is in pivotal attachment to the guide arm bracket at a fifth pivot point and the second end extends upward and rearward from the fifth pivot point;
    (e) wherein the bell crank is pivotally connected between the lever arms at the second pivot point and to the guide arm at a third pivot point;
    (f) a shock absorbing member in pivotal attachment at one end to the shock mount and at another end at a fourth pivot point to the bell crank;
    (g) the first pivot is positioned substantially above and forward the bottom bracket;
    (h) the second pivot point is positioned substantially rearward the first pivot point;
    (i) the third pivot point is positioned substantially below the second pivot point;
    (j) the fourth pivot point is positioned substantially forward a vector passing through the first and second pivot points; and
    (k) the fifth pivot point is positioned above and rearward the first pivot point.

2. The rear bicycle suspension of claim 1 wherein the swing arm rear attachment point is for receiving a wheel hub.

3. The rear bicycle suspension of claim 1 wherein the swing arm rear attachment point is for receiving a wheel hub link member.

4. The rear bicycle suspension of claim 1 wherein the second pivot point is located in the range of 17-17.5 centimeters radial from the first pivot point.

5. The rear bicycle suspension of claim 1 wherein the swing arms have a range of travel less than four inches and follow a rear arching path.

6. The rear bicycle suspension of claim 3 further comprising a pair of the hub link members one for either side of a rear wheel each having upper and lower attachment points and a rear attachment point for receiving the axle of the wheel hub wherein the swing arm rear attachment point is pivotally attached to the upper attachment point on the wheel hub link and further having a pair of control arms pivotally attached to each side of the frame and extending rearward and pivotally attached to the lower wheel hub link attachment point.

7. The rear bicycle suspension of claim 6 wherein the swing arms have an adjustable range of travel in the range of 12.7 to 22.8 centimeters.

8. The rear bicycle suspension of claim 7 wherein the range of travel is adjusted by moving the third pivot point slightly upward in the bell crank.

* * * * *